United States Patent
Miyamoto et al.

(10) Patent No.: US 9,948,483 B2
(45) Date of Patent: Apr. 17, 2018

(54) BASE STATION APPARATUS, WIRELESS COMMUNICATION SYSTEM, AND COMMUNICATION METHOD FOR UPLINK COORDINATED MULTI-POINT TRANSMISSION AND RECEPTION WITH INTRA-PHY SPLIT BASE STATION ARCHITECTURE

(71) Applicant: NIPPON TELEGRAPH AND TELEPHONE CORPORATION, Tokyo (JP)

(72) Inventors: Kenji Miyamoto, Yokosuka (JP); Shigeru Kuwano, Yokosuka (JP); Jun Terada, Yokosuka (JP); Takayoshi Tashiro, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/116,137

(22) PCT Filed: Jan. 28, 2015

(86) PCT No.: PCT/JP2015/052308
§ 371 (c)(1),
(2) Date: Aug. 2, 2016

(87) PCT Pub. No.: WO2015/119009
PCT Pub. Date: Aug. 13, 2015

(65) Prior Publication Data
US 2017/0180157 A1    Jun. 22, 2017

(30) Foreign Application Priority Data
Feb. 6, 2014 (JP) .................. 2014-021158

(51) Int. Cl.
*H04L 25/02* (2006.01)
*H04B 7/024* (2017.01)
(Continued)

(52) U.S. Cl.
CPC ......... *H04L 25/0204* (2013.01); *H04B 7/024* (2013.01); *H04B 7/0413* (2013.01);
(Continued)

(58) Field of Classification Search
CPC .... H04B 17/309; H04B 17/373; H04B 7/024; H04B 7/0413; H04L 25/0204; H04W 52/42
See application file for complete search history.

(56) References Cited

U.S. PATENT DOCUMENTS

2007/0015544 A1*   1/2007   Garrett .................. H04W 88/08
                                                              455/562.1
2009/0103472 A1*   4/2009   Ni ...................... H04B 7/15592
                                                              370/315
(Continued)

FOREIGN PATENT DOCUMENTS

CN        103004120 A      3/2013
CN        103503326 A      1/2014
(Continued)

OTHER PUBLICATIONS

Dajie Jiang et al., "Uplink Coordinated Multi-Point Reception for LTE-Advanced Systems", Wireless Communications, Networking and Mobile Computing, 2009, pp. 24-26.
(Continued)

*Primary Examiner* — Dung B Huynh
(74) *Attorney, Agent, or Firm* — Harness, Dickey & Pierce, P.L.C.

(57) ABSTRACT

A base station apparatus is provided with at least one remote unit apparatus each including at least one antenna, and a
(Continued)

central unit apparatus connected to each remote unit apparatus via a transmission path. The antenna provided in the remote unit apparatus receives a transmission signal wirelessly transmitted from at least one wireless terminal each including at least one antenna. The remote unit apparatus includes a channel estimation unit that estimates channel information between the antenna of the wireless terminal and the antenna of the remote unit apparatus, using a reception signal received by the antenna provided in the remote unit apparatus, a likelihood calculation unit that calculates likelihood of each transmission signal included in the reception signal, for each antenna provided in the remote unit apparatus, using the channel information estimated by the channel estimation unit, and an inter-unit transmission unit that transmits likelihood information calculated by the likelihood calculation unit to the central unit apparatus. The central unit apparatus is provided with an inter-unit receiving unit that receives the likelihood information transmitted from the inter-unit transmission unit, and a signal detection unit that combines the likelihood information received by the inter-unit receiving unit, and outputs a signal corresponding to each transmission signal transmitted from the wireless terminal, using combined likelihood information.

9 Claims, 10 Drawing Sheets

(51) Int. Cl.
  *H04B 17/373* (2015.01)
  *H04W 52/42* (2009.01)
  *H04B 7/0413* (2017.01)
  *H04B 17/309* (2015.01)
(52) U.S. Cl.
  CPC ......... *H04B 17/309* (2015.01); *H04B 17/373* (2015.01); *H04W 52/42* (2013.01)

(56) References Cited

U.S. PATENT DOCUMENTS

| | | | | |
|---|---|---|---|---|
| 2010/0062775 A1* | 3/2010 | Hwang | ................. | H04W 36/18 |
| | | | | 455/442 |
| 2010/0067435 A1* | 3/2010 | Balachandran | ....... | H04L 5/0035 |
| | | | | 370/328 |
| 2010/0290413 A1* | 11/2010 | Kuwahara | ............. | H04W 24/02 |
| | | | | 370/329 |
| 2013/0329830 A1 | 12/2013 | Yokomakura et al. | | |
| 2014/0078880 A1* | 3/2014 | Bhattad | ................ | H04B 7/0413 |
| | | | | 370/203 |
| 2014/0286256 A1* | 9/2014 | Chowdhury | ........... | H04L 47/56 |
| | | | | 370/329 |
| 2015/0244499 A1* | 8/2015 | Alexander | ............. | H01Q 23/00 |
| | | | | 375/341 |

FOREIGN PATENT DOCUMENTS

| | | |
|---|---|---|
| EP | 1833186 A1 | 9/2007 |
| JP | 2012-178727 A | 9/2012 |
| WO | WO-2006/070478 A1 | 7/2006 |

OTHER PUBLICATIONS

K.Higuchi et al., "Multi-Antenna Wireless Transmission Technique, Part 3, Signal detection Technique in MIMO Multiplexing Method", NTT DoCoMo Technical Journal, vol. 14, No. 1, pp. 66-75, Jul. 2012, with partial translation thereof.
Y. Tanabe et al., "MIMO Receiving Algorithms Appropriate to System Requirements", Toshiba Review, vol. 61, No. 4, pp. 40-43 (2006), with partial translation thereof.
K. Higuchi et al.,"Special Topic, Broadband Packet Wireless Access 1 Gbit/s Packet Signal Transmission Experiment, Experiment Apparatuses and Summary of Technique", NTT DoCoMo Technical Journal, vol. 13, No. 2, pp. 6-15, Sep. 2011, with partial translation thereof.
Song-Nam Hong et al., Compute-and-Forward Strategies for Cooperative Distributed Antenna Systems, IEEE Transactions on Information Theory, vol. 59, No. 9, IEEE, Sep. 30, 2013, pp. 5227-5243.
International Search Report for PCT/JP2015/052308, ISA/JP, dated Mar. 10, 2015, with English translation thereof.
Keying Wu et al: "Uplink multi-Bs MIMO with limited backhaul bandwidth 1", 2011 IEEE Wireless Communications and Networking Conference (WCNC 2011): Cancun, Mexico, Mar. 28-31, 2011, IEEE, Piscataway, NJ, Mar. 28, 2011, pp. 1443-1448, with English abstract.
Extended European Search Report for corresponding application EP 15746734.1, EPO/Munich, dated Jul. 6, 2017.
Chinese Office Action for parallel application CN201580007203.6, SIPO, dated Oct. 10, 2017 with partial translation of Search Report.

* cited by examiner

BASE STATION APPARATUS, WIRELESS COMMUNICATION SYSTEM, AND COMMUNICATION METHOD FOR UPLINK COORDINATED MULTI-POINT TRANSMISSION AND RECEPTION WITH INTRA-PHY SPLIT BASE STATION ARCHITECTURE

TECHNICAL FIELD

A configuration in a wireless communication system in which a plurality of antenna units equipped with part of functions of a base station are physically stretched out, and are used as remote units is being studied. The present invention relates to a communication scheme between a plurality of remote units and a central unit that controls them.

Priority is claimed on Japanese Patent Application No. 2014-021158, filed Feb. 6, 2014, the content of which is incorporated herein by reference.

BACKGROUND ART

A configuration in a wireless communication system, particularly, in a mobile communication system, in which a plurality of antenna units equipped with part of functions of a base station are physically stretched out and are used as remote units is being studied. Here, an antenna unit refers to a unit that is equipped with a transmission interface, a wireless transceiver, and an antenna. A base station with a plurality of remote units stretched out therefrom functions as a central unit to control the remote units. In the communication scheme for performing communication between the central unit and the remote units, two system configurations which differ from each other in terms of distribution of functions between the central unit and the remote units are being studied.

One of them is referred to as full centralization. As shown in FIG. 1, in this system configuration, a central unit 10 is equipped with functions of a physical layer excluding antenna units and functions of a data link layer and higher layers, and remote units 20 each equipped only with an antenna unit are stretched out. The other is referred to as partial centralization. As shown in FIG. 2, in this system configuration, a central unit 10 is equipped with functions of a data link layer and higher layers, and remote units 20 each equipped with functions of a physical layer including an antenna unit are stretched out. Moreover, as shown in FIG. 3, a configuration in which part of the functions of the physical layer is left in the central unit 10 in the configuration of the partial centralization is also being studied.

Today, the more widely used system configuration is full centralization. The communication scheme between the central unit 10 and the remote units 20 in this configuration uses a digital radio over fiber (RoF) technique as typified by a common public radio interface (CPRI).

On the other hand, in a mobile communication system, an area covered by a single base station is referred to as cell, and there is a problem of a phenomenon in which when a mobile station reaches the edge region of a cell, wireless signals being transmitted from a desired base station interfere with wireless signals being transmitted from an adjacent base station, resulting in a significant reduction in transmission rate between the base station and the mobile station. As a means for solving the problem of such interference between the signals from the cells, as shown in FIG. 4 and FIG. 5, a coordinated multi-point transmission/reception (CoMP) technique in which adjacent base stations (FIG. 4), a central unit 10 and a remote unit 20 (FIG. 5), or remote units 20 (FIG. 5) operate in cooperation with each other to communicate with a terminal 30 (mobile station) which is positioned at the edge of a cell 92 is being studied. It is to be noted that in FIG. 4 and FIG. 5, reference symbol 91 denotes a core network. Moreover, as one of the techniques for implementing the CoMP in uplink, there is a technique known as joint reception (JR), in which signals are received at different base stations to improve signal quality, and in this case, a plurality of base stations that receive signals in cooperation with each other may be seen as reception antennas for multiple-input multiple-output (MIMO) transmission. At this time, MIMO transmission when the number of terminals that transmit signals is one is referred to as single user (SU)-MIMO, and MIMO transmission when a plurality of terminals transmit signals simultaneously is referred to as multi user (MU)-MIMO (for example, refer to Non-Patent Document 1).

Examples of techniques for signal detection in MIMO transmission include: minimum mean square error (MMSE), in which signals are detected by means of a matrix operation with a reception weight matrix generated based on channel information estimated from reception signals; successive interference cancellation (SIC), in which signals are detected sequentially from higher quality signals; and maximum likelihood detection (MLD), which is also referred to as a maximum likelihood decision method, in which all combinations of transmission signals are compared with reception signals to perform discrimination (for example, refer to Non-Patent Document 2). In MLD, there are a receiving process that uses hard decision, and a receiving process that uses soft decision. In the hard decision, code words corresponding to estimated transmission signals are output as an output of the MLD, whereas in the soft determination, likelihood information of each bit of estimated transmission signals is output (for example, refer to Non-Patent Documents 3 and 4). Moreover, in the MLD process, the number of transmission signal vector candidates increases exponentially in accordance with the number of modulation levels and the number of transmission antennas. Therefore, techniques for reducing the amount of computation in the MLD process at each remote unit are being studied (for example, refer to Non-Patent Document 3).

FIG. 6 shows a signal transmission flow in the case of performing CoMP by means of JR on a full centralization system configuration. In FIG. 6, the number of remote units that operate in cooperation with each other is two, and a single antenna 21 is provided in each of these remote units 20. However, the number of remote units that operate in cooperation with each other need not be limited to two, and the number of antennas to be provided in each remote unit 20 may be more than one. Furthermore, in FIG. 6, the number of terminals that transmit signals is one, and the number of antennas of a terminal 30 is two. However, the number of terminals 30 that transmit signals may be more than one, and the number of antennas of the terminal need not be limited to two. Transmission signals $s_1$ and $s_2$ are transmitted from two antennas 31 of the terminal 30, and are received as reception signals $r_1$ and $r_2$ by the antennas 21 of a remote unit #1 and a remote unit #2, via a wireless transmission path expressed by a channel matrix H of elements $h_{ij}$ (i=1, 2, and j=1, 2). At this time, noises $n_1$ and $n_2$ are added to the reception signals during a reception process of RF signals in radio frequency (RF) receiving units 22. The relationship between these transmission signals, channel matrix, reception signals, and noises is expressed as Equation (1) below using vectors and matrices.

[Equation 1]

$$r = Hs + n \Leftrightarrow \begin{bmatrix} r_1 \\ r_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad (1)$$

The reception signals received by the remote units 20 undergo signal conversion such as conversion into CPRI signals, in signal conversion units 23, and they are then transmitted to the central unit 10. In the central unit 10, signal conversion units 11 perform signal conversion on the signals that have been transmitted, and a MIMO signal detection unit 13 performs a MIMO signal detection process based on the reception signals $r_1$ and $r_2$ received at the remote units 20. As a MIMO signal detection process, MLD is used, for example. When the transmission signals $s_1$ and $s_2$ have both been modulated by means of binary phase-shift keying (BPSK), in the MIMO signal detection by means of MLD, four transmission signal vector candidates $s_{c1}$, $s_{c2}$, $s_{c3}$, and, $s_{c4}$ expressed as Equation (2) to Equation (5) below are multiplied by a channel matrix $H_e$, which has been estimated by means of channel estimation in a channel estimation unit 12 from the reception signals $r_1$ and $r_2$, to generate reception replicas $r_{c1}$, $r_{c2}$, $r_{c3}$, and $r_{e4}$ expressed as Equation (6) to Equation (9) below.

[Equation 2]

$$s_{c1} = \begin{bmatrix} e^{j0} \\ e^{j0} \end{bmatrix} \quad (2)$$

[Equation 3]

$$s_{c2} = \begin{bmatrix} e^{j0} \\ e^{j\pi} \end{bmatrix} \quad (3)$$

[Equation 4]

$$s_{c3} = \begin{bmatrix} e^{j\pi} \\ e^{j0} \end{bmatrix} \quad (4)$$

[Equation 5]

$$s_{c4} = \begin{bmatrix} e^{j\pi} \\ e^{j\pi} \end{bmatrix} \quad (5)$$

[Equation 6]

$$r_{c1} = H_e s_{c1} \quad (6)$$

[Equation 7]

$$r_{c2} = H_e s_{c2} \quad (7)$$

[Equation 8]

$$r_{c3} = H_e s_{c3} \quad (8)$$

[Equation 9]

$$r_{c4} H_e s_{c4} \quad (9)$$

Squared Euclidean distances between the reception replicas and the reception signal r expressed as Equation (1) are calculated as Equation (10) to Equation (13) below, and the transmission signal vector candidate that corresponds to the reception replica with the minimum squared Euclidean distance is determined as an estimated transmission signal.

[Equation 10]

$$\|r - r_{c1}\|^2 \quad (10)$$

[Equation 11]

$$\|r - r_{c2}\|^2 \quad (11)$$

[Equation 12]

$$\|r - r_{c3}\|^2 \quad (12)$$

[Equation 13]

$$\|r - r_{c4}\|^2 \quad (13)$$

Finally, the determined transmission signals, after having been output as corresponding code words $c_1$ and $c_2$, undergo a decoding process in decoding units 14, and they are supplied to a media access control (MAC) function unit 15 of the data link layer as bit sequences $b_1$ and $b_2$. Here, after the signal conversion in the central unit 10, a process for receiving multi-carrier signals, such as those in orthogonal frequency division multiplexing (OFDM), may be performed on the reception signals. Moreover, transmission signal vector candidates do not always have to be limited to mapping on a complex plane as shown in Equation (2) to Equation (5), and another mapping may be performed. Furthermore, an MLD process such as the one described above is a receiving process that uses hard decision. However, a configuration which uses a receiving process that uses soft decision to output likelihood information may be employed. In this case, the output likelihood information is input to a soft input decoder such as a turbo decoder, undergoes a decoding process, and it is then output as a bit sequence.

However, in signal transmission in such a full centralization system configuration, signals obtained by performing sampling and quantization on the reception signals $r_1$ and $r_2$ are transmitted. Therefore, there is a problem in that the transmission capacity between the remote units and the central unit becomes extremely large. For example, when CPRI is used for signal transmission, if communications in a wireless section are performed at a transmission rate of 75 M bit per seconds (bps), the required transmission rate between the remote units and the central unit is 1,228 Mbps, which is approximately 16 times 75 Mbps.

On the other hand, FIG. 7 shows signal transmission when CoMP using JR is performed in a partial centralization system configuration, which, in comparison with a full centralization system configuration, can reduce the transmission capacity required between the central unit 10 and the remote units 20. As with FIG. 6, in FIG. 7, the number of remote units that operate in cooperation with each other need not be limited to two, and the number of antennas to be provided in a single remote unit 20 may be more than one. Moreover, the number of terminals 30 that transmit signals may be more than one, and the number of antennas of each terminal 30 need not be limited to two.

The decoding process, which is to be performed in the central unit 10 in full centralization, is performed in the decoding unit 26 of each remote unit. In partial centralization, in contrast with full centralization, data transmitted between the central unit 10 and the remote units 20 are bit sequences $b_1$ and $b_2$, which have undergone decoding. The data transmitted between the central unit 10 and the remote units 20 is not data of signals obtained by performing sampling and quantization on wireless signals, but is bit sequence data after decoding. Therefore, the transmission capacity between the central unit 10 and the remote units 20 becomes significantly small, compared with the case of full centralization. However, since the functions of the physical layer are distributed in partial centralization, there is a problem in that MIMO signal detection that uses reception signals $r_1$ and $r_2$ both as shown in FIG. 7, that is, CoMP, cannot be performed in the MIMO signal detection unit 25. Moreover, in the case of the configuration of FIG. 7, channel information that can be estimated by the channel estimation unit 24 of each remote unit 20 is $h_{e11}$ and $h_{e12}$ only at the remote unit #1, and it is $h_{e21}$ and $h_{e22}$ only at the remote unit #2. It is to be noted that after RF reception has been performed at a remote unit, a process for performing reception of multi-carrier signals such as those in OFDM on reception signals may be performed.

PRIOR ART DOCUMENTS

Non-Patent Documents

Non-Patent Document 1: "Uplink Coordinated Multi-Point Reception for LTE-Advanced Systems", Wireless Communications, Networking and Mobile Computing, 2009, pp. 24-26
Non-Patent Document 2: "Multi-Antenna Wireless Transmission Technique, Part 3, Signal detection Technique in MIMO Multiplexing Method", NTT DoCoMo Technical Journal, Vol. 14, No. 1, pp. 66-75
Non-Patent Document 3: "MIMO Receiving Algorithms Appropriate to System Requirements", Toshiba Review, Vol. 61, No. 4, pp. 40-43
Non-Patent Document 4: "Special Topic, Broadband Packet Wireless Access 1 Gbit/s Packet Signal Transmission Experiment, Experiment Apparatuses and Summary of Technique", NTT DoCoMo Technical Journal, Vol. 13, No. 2, pp. 6-15

SUMMARY OF INVENTION

Problems to be Solved by the Invention

In order to solve the above problems, an object of the present invention is to provide a base station apparatus, a wireless communication system, and a communication method, capable of performing uplink CoMP even with a partial centralization system configuration.

Means for Solving the Problems

In the present invention, in a partial centralization system configuration, likelihood calculation is performed at each remote unit using only a reception signal and channel information that can be acquired at each remote unit, and likelihood information or log likelihood ratio information obtained by the likelihood calculation is collected and combined, thereby making it possible to realize uplink CoMP even in partial centralization, in which functions of the physical layer are distributed.

Specifically, the base station apparatus according to the present invention is a base station apparatus including:
at least one remote unit apparatus each comprising at least one antenna; and
a central unit apparatus connected to each remote unit apparatus via a transmission path,
wherein the antenna provided in the remote unit apparatus receives a transmission signal wirelessly transmitted from at least one wireless terminal each comprising at least one antenna, and
the remote unit apparatus comprising:
a channel estimation unit that estimates channel information between the antenna of the wireless terminal and the antenna of the remote unit apparatus, using a reception signal received by the antenna provided in the remote unit apparatus;
a likelihood calculation unit that calculates likelihood of each transmission signal included in the reception signal, for each antenna provided in the remote unit apparatus, using the channel information estimated by the channel estimation unit; and
an inter-unit transmission unit that transmits likelihood information calculated by the likelihood calculation unit to the central unit apparatus, and
the central unit apparatus comprising:
an inter-unit receiving unit that receives each likelihood information transmitted from the inter-unit transmission unit; and
a signal detection unit that combines the likelihood information received by the inter-unit receiving unit and outputs a signal corresponding to each transmission signal transmitted from the wireless terminal, using combined likelihood information.

In the base station apparatus according to the present invention,
the likelihood calculation unit may calculate a reception replica using the channel information, for each transmission signal vector candidate determined in accordance with a modulation scheme of the transmission signal, and calculate a squared Euclidean distance between the reception replica for each transmission signal vector candidate and the reception signal, as likelihood of the reception signal, and
the signal detection unit may combine squared Euclidean distances received by the inter-unit receiving unit for each transmission signal vector candidate, and select a transmission signal vector candidate that corresponds to minimum combined likelihood, to thereby output a code word corresponding to each transmission signal transmitted from the wireless terminal.

In the base station apparatus according to the present invention,
the likelihood calculation unit may calculate log likelihood ratios of bits corresponding to each transmission signal as likelihood of the reception signal by performing soft decision using the channel information, and
the signal detection unit may combine the log likelihood ratios of the bits received by the inter-unit receiving unit, for each transmission signal, and output a combined value that corresponds to each transmission signal.

Specifically, the wireless communication system in accordance with the present invention includes:
the base station apparatus according to the present invention; and
the wireless terminal.

Specifically, the communication method in accordance with the present invention is a communication method in a base station apparatus including: at least one remote unit apparatus each comprising at least one antenna; and a central unit apparatus connected to each remote unit apparatus via a transmission path, the communication method including:

a channel estimation step in which, when each antenna provided in the remote unit apparatus receives each transmission signal that is wirelessly transmitted from at least one wireless terminal each comprising at least one antenna, the remote unit apparatus uses a received reception signal to estimate channel information between the antenna of the wireless terminal and the antenna of the base station apparatus;

a likelihood calculation step in which the remote unit apparatus uses the estimated channel information to calculate, for each antenna provided in the remote unit apparatus, likelihood of each transmission signal included in the reception signal, and transmits the calculated likelihood of each reception signal to the central unit apparatus; and a signal detection step in which the central unit apparatus combines likelihood information received from the remote unit apparatus, and outputs a signal corresponding to each transmission signal transmitted from the wireless terminal, using combined likelihood information.

In the communication method in accordance with the present invention, in the likelihood calculation step, the remote unit apparatus may calculate a reception replica using the channel information, for each transmission signal vector candidate determined in accordance with a modulation scheme of the transmission signal, calculate a squared Euclidean distance between the reception replica for each transmission signal vector candidate and the reception signal, as likelihood of the reception signal, and output the squared Euclidean distance to the central unit apparatus, and in the signal detection step, the central unit apparatus may combine the squared Euclidean distance received from the remote unit apparatus, for each transmission signal vector candidate, and select a transmission signal vector candidate that corresponds to minimum combined likelihood, to thereby output a code word corresponding to each transmission signal transmitted from the wireless terminal.

In the communication method in accordance with the present invention, in the likelihood calculation step, the remote unit apparatus may calculate log likelihood ratios of bits corresponding to each transmission signal as likelihood of the reception signal, by performing soft decision using the channel information, and transmit the log likelihood ratios to the central unit apparatus, and in the signal detection step, the central unit apparatus may combine the log likelihood ratios of the bits received from the remote unit apparatus, for each transmission signal, and output a combined value that corresponds to each transmission signal.

Advantageous Effect of the Invention

It becomes possible to perform uplink CoMP by performing signal transmission between a central unit and remote units by means of partial centralization with the present invention applied thereto, rather than by means of full centralization which is widely used today.

MODES FOR CARRYING OUT THE INVENTION

Figure 1:
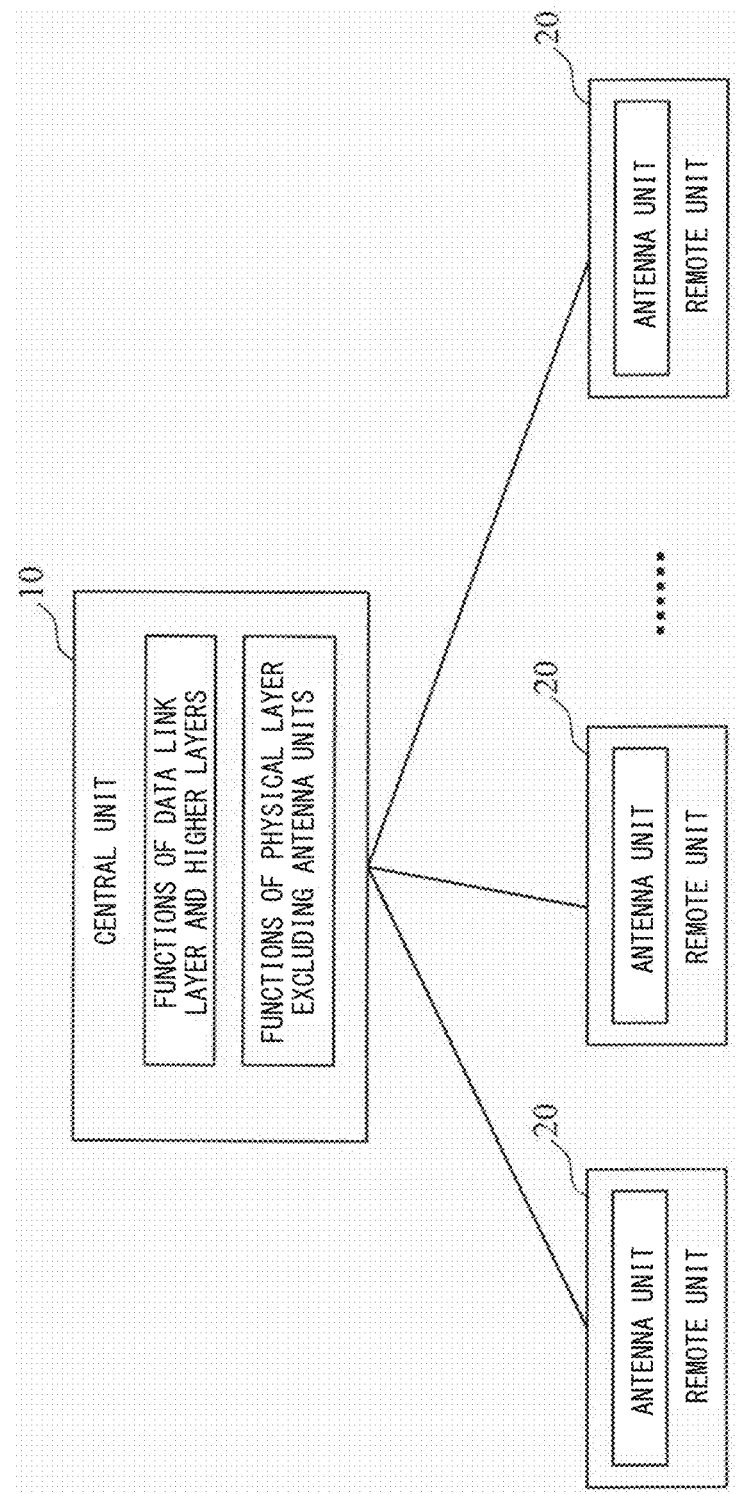
FIG. 1 shows a first example of a system configuration for performing communication between a central unit and remote units related to the present invention.
Figure 2:
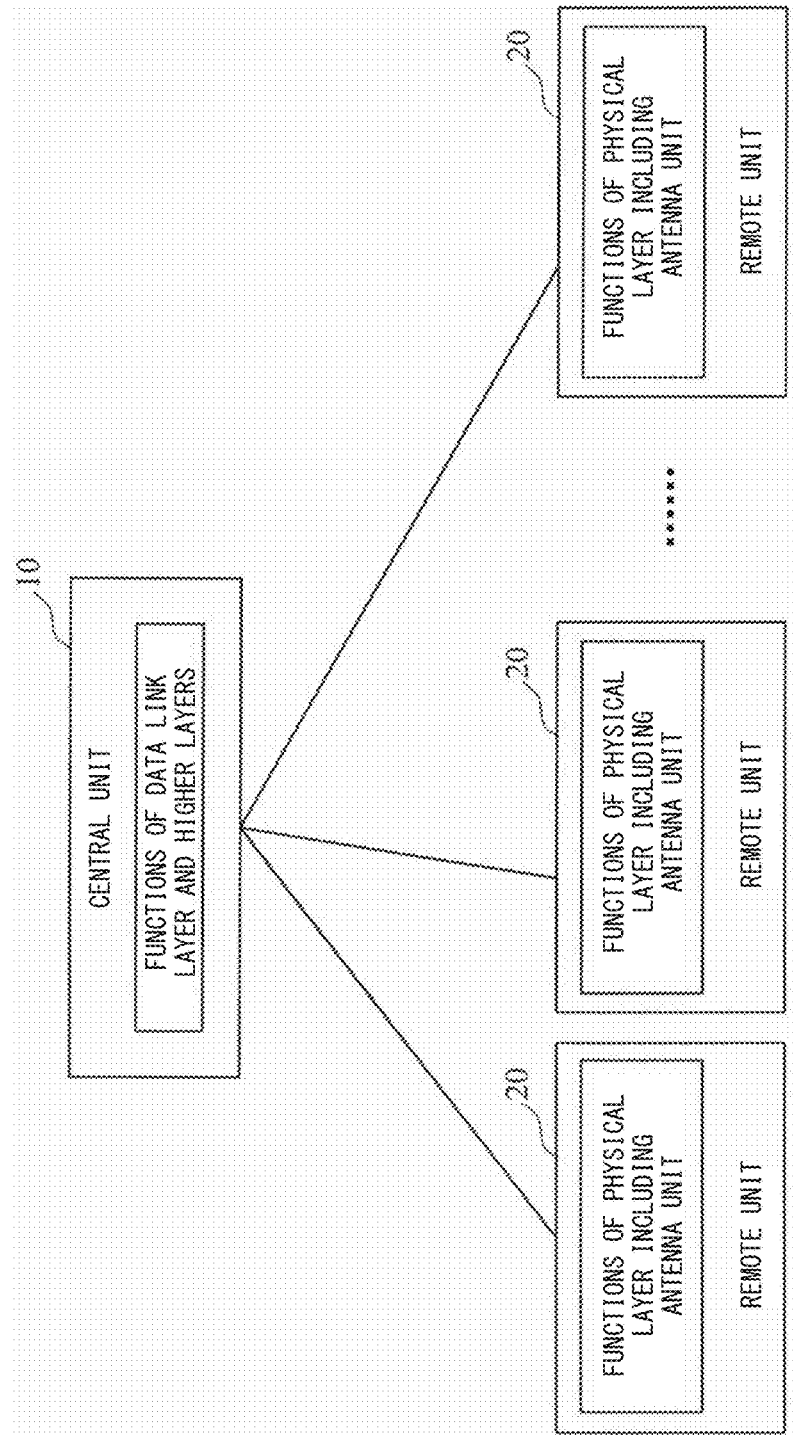
FIG. 2 shows a second example of a system configuration for performing communication between a central unit and remote units related to the present invention.

Hereunder, embodiments of the present invention will be described with reference to the drawings. It is to be noted that the present invention is not limited to the embodiments shown below. These embodiments are illustrated merely as examples, and various modifications and/or improvements may be made to the present invention based on the knowledge of one skilled in the art. It is to be noted that in the present specification and in the drawings, constituents having the same reference symbols mutually denote the same constituents.

Embodiment 1

Figure 3:
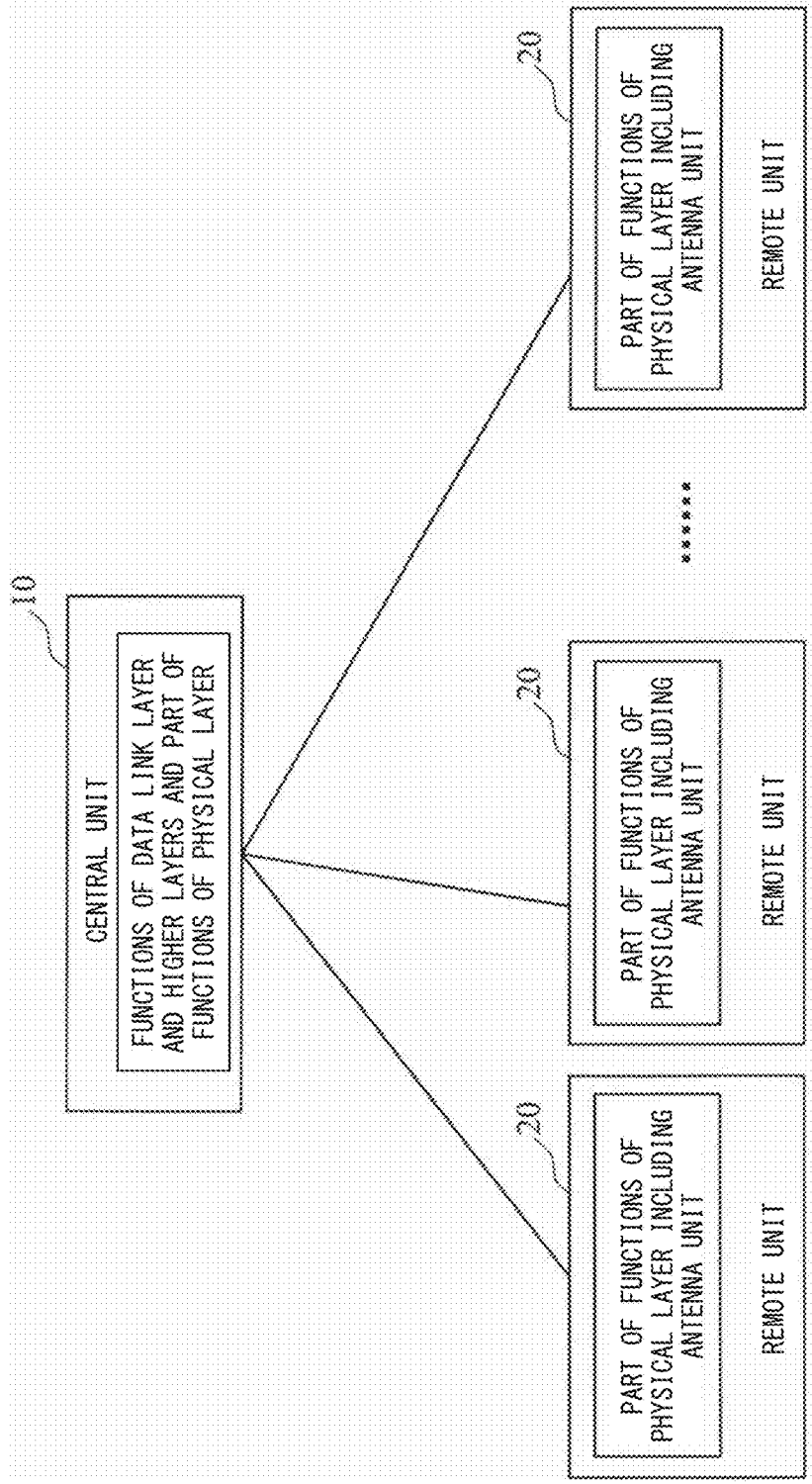
FIG. 3 shows a third example of a system configuration for performing communication between a central unit and remote units related to the present invention.
Figure 4:
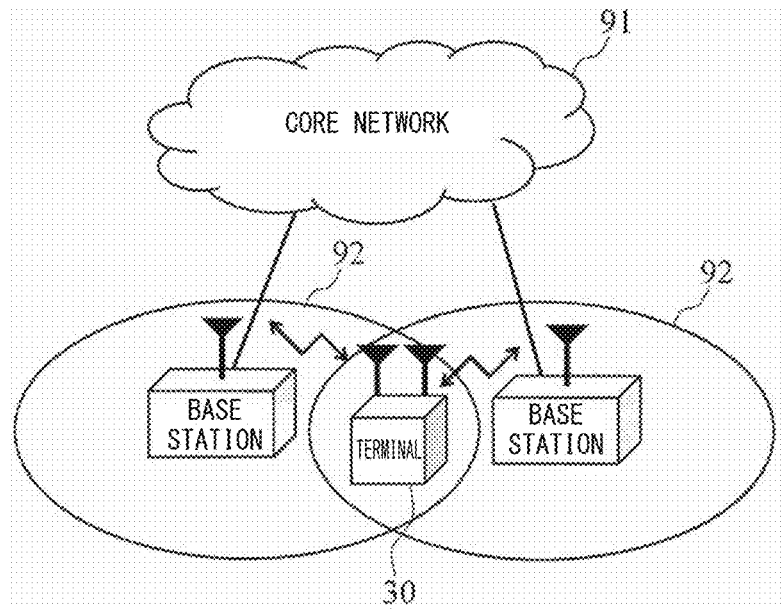
FIG. 4 shows an example of a technique of implementing CoMP when base stations operate in cooperation with each other.
Figure 5:
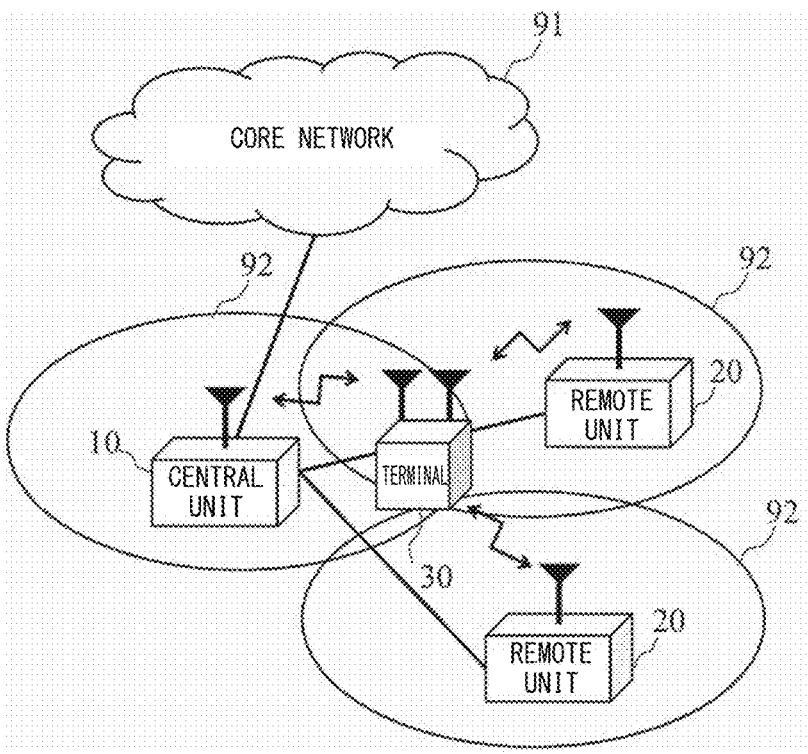
FIG. 5 shows an example of a technique of implementing CoMP when a central unit and remote units operate in cooperation with each other.
Figure 6:
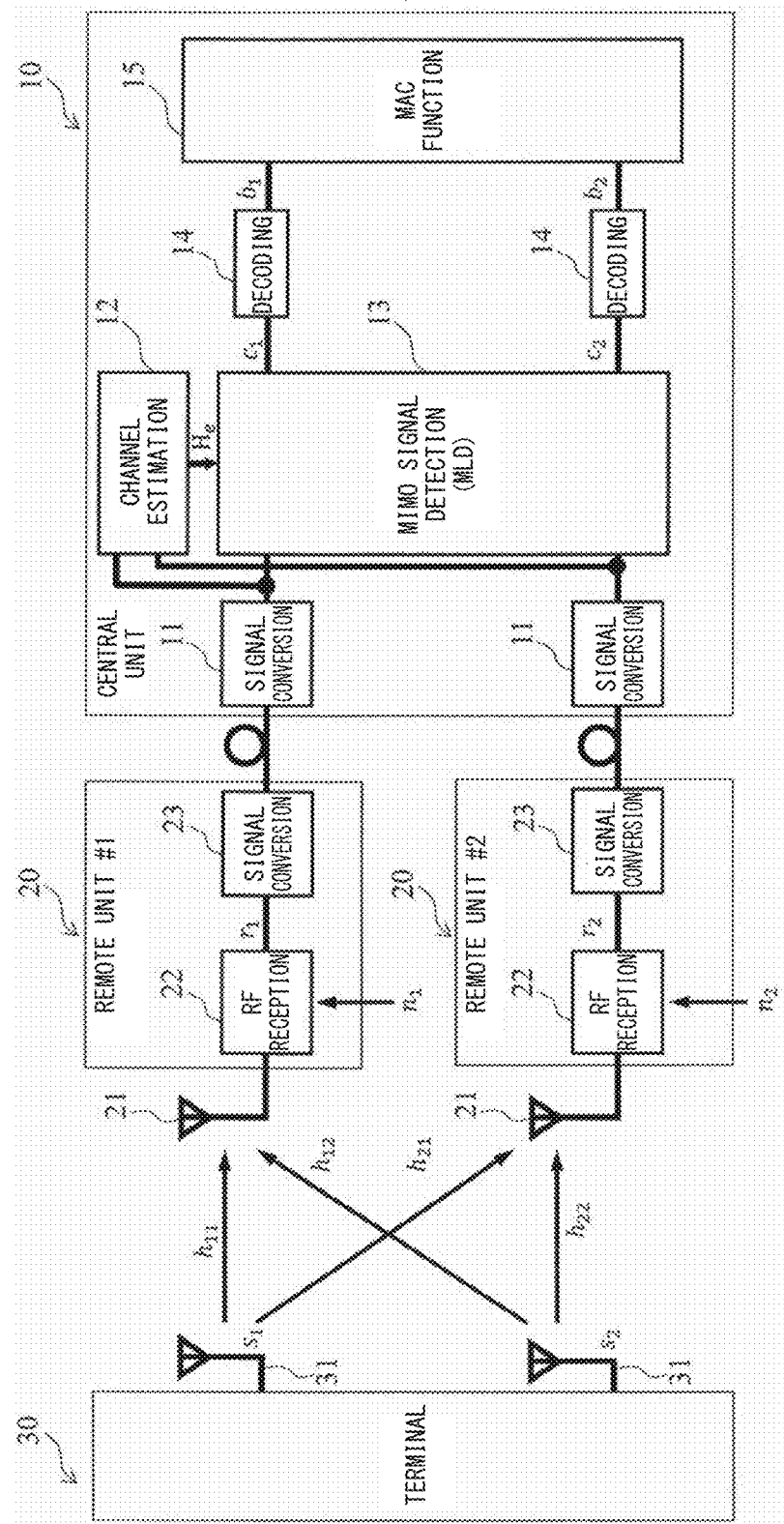
FIG. 6 shows an example of a system configuration for performing CoMP using JR in a full centralization system configuration.
Figure 7:
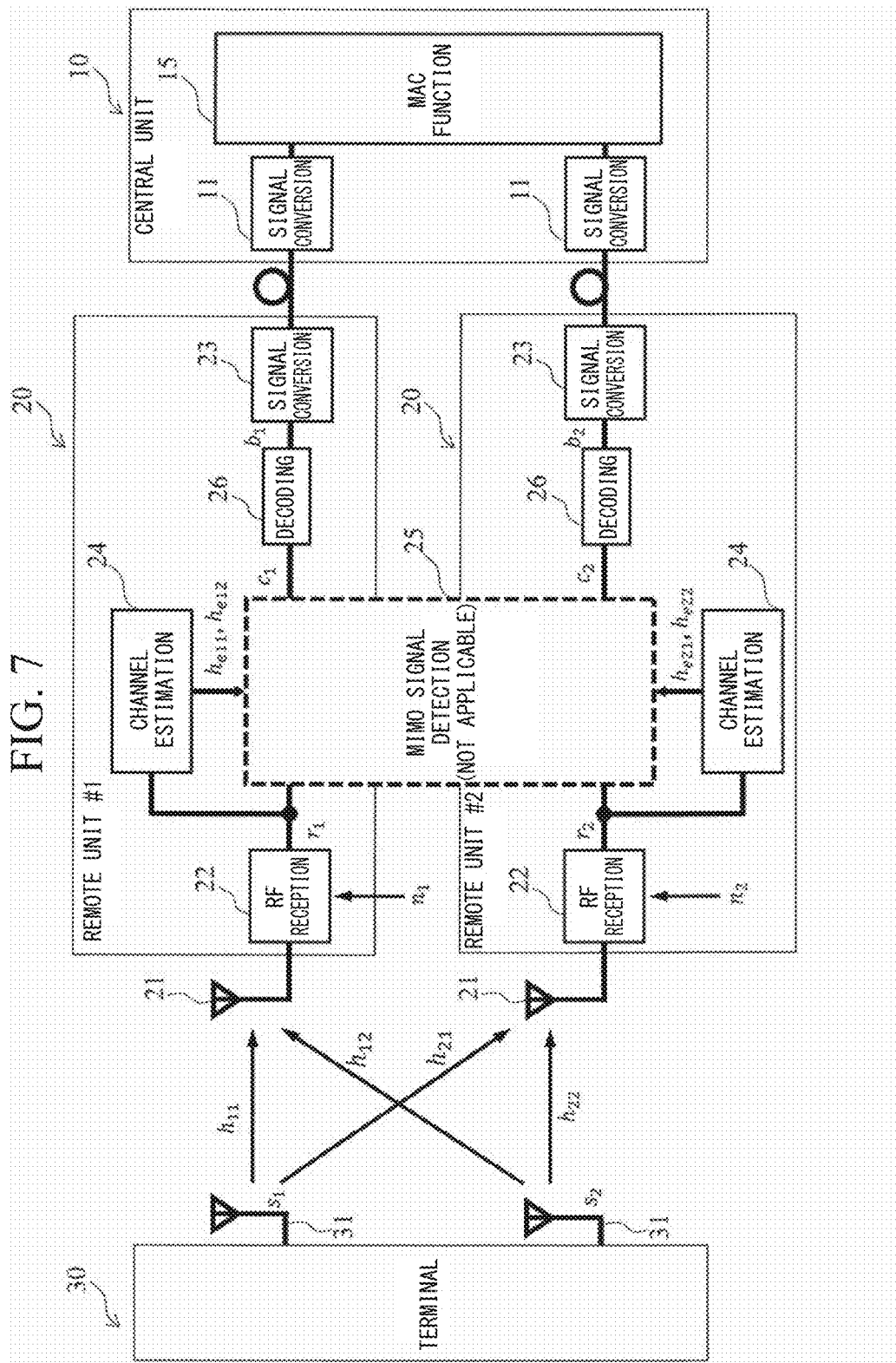
FIG. 7 shows an example of a system configuration for performing CoMP using JR in a partial centralization system configuration.
Figure 8:
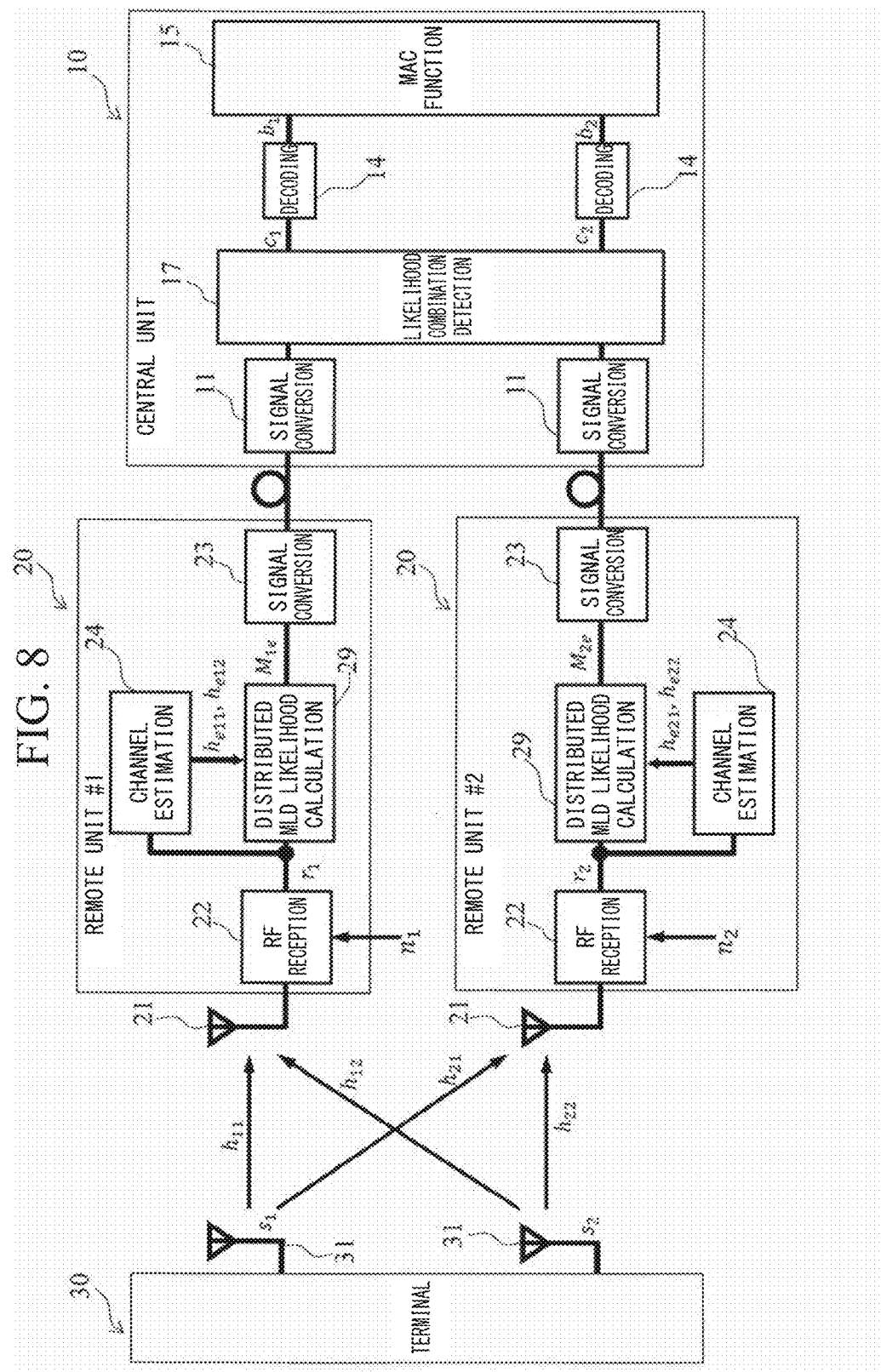
FIG. 8 shows an example of a wireless communication system in accordance with Embodiment 1.

FIG. 8 shows an example of a wireless communication system in accordance with Embodiment 1. The wireless communication system in accordance with the present embodiment is provided with a central unit 10 that functions as a central unit apparatus, remote units 20 that function as remote unit apparatuses, and a terminal 30 that functions as a wireless terminal. The terminal 30 performs CoMP signal transmission to the plurality of remote units 20. In this case, the configuration is such that part of functions of the physical layer remains in the central unit as shown in FIG. 3.

The wireless communication system in accordance with the present embodiment has the terminal 30 (wireless terminal) provided with one or more antennas. As an example, FIG. 8 shows a case in which the number of wireless terminals is one and the number of antennas is two. The wireless communication system in accordance with the present embodiment is provided with one or more remote units 20 each provided with one or more antennas. As an example, FIG. 8 shows a case in which the number of antennas is one and the number of apparatuses is two. It is to be noted that in FIG. 8, the number of the terminals 30 is one, the number of the antennas of the terminal 30 is two, the number of cooperating remote units 20 is two, and the number of antennas of each remote unit 20 is one. However, these numbers are not limited.

In the present embodiment, the remote units 20 perform a receiving process by means of MLD. The central unit 10 is provided with signal conversion units 11 that function as inter-unit receiving units, a likelihood combination detection unit 17 that functions as a signal detection unit, decoding units 14, and a MAC function unit 15. Each remote unit 20 is provided with an antenna 21, an RF receiving unit 22, a signal conversion unit 23 that functions as an inter-unit transmission unit, a channel estimation unit 24, and a distributed MLD likelihood calculation unit 29 that functions as a likelihood calculation unit. The terminal 30 is provided with a transmission function unit (not shown in figure) and antennas 31.

In the communication method in accordance with the present embodiment, a channel estimation step, a likelihood calculation step, and a signal detection step are performed sequentially.

In the channel estimation step, the remote units 20 receive transmission signals $s_1$ and $s_2$, and use reception signals $r_1$ and $r_2$ to estimate channel information between the antenna 31 and the antennas 21. In the present embodiment, the RF receiving unit 22 of the remote unit #1 receives the transmission signals $s_1$ and $s_2$ and outputs the reception signal $r_1$. The channel estimation unit 24 of the remote unit #1 uses the reception signal $r_1$ to estimate channel information $h_{e11}$ and $h_{12}$. The RF receiving unit 22 of the remote unit #2 receives the transmission signals $s_1$ and $s_2$ and outputs the reception signal $r_2$. The channel estimation unit 24 of the remote unit #2 uses the reception signal $r_2$ to estimate channel information $h_{e21}$ and $h_{e22}$.

In the likelihood calculation step, the remote units 20 use the estimated channel information to calculate the likelihood of each of transmission signals included in the reception signals, for each antenna 21. In the present embodiment, the distributed MLD likelihood calculation unit 29 of the remote unit #1 calculates squared Euclidean distances $M_{1e}$ (e here is an integer from 1 to the number of the squared Euclidean distances) and outputs them as likelihood information. Then, the signal conversion unit 23 of the remote unit #1 transmits the squared Euclidean distance information $M_{1e}$ to the signal conversion unit 11. On the other hand, the distributed MLD likelihood calculation unit 29 of the remote unit #2 calculates squared Euclidean distances $M_{2e}$ and outputs them as likelihood information. Then, the signal conversion unit 23 of the remote unit #2 transmits the squared Euclidean distance information $M_{2e}$ to the signal conversion unit 11.

In the signal detection step, the likelihood combination detection unit 17 combines the likelihood information transmitted from the remote units 20 and outputs signals corresponding to the transmission signals $s_1$ and $s_2$ transmitted from the terminal 30, using the combined likelihood information. In the present embodiment, the signal conversion unit 11 connected to the remote unit #1 receives the squared Euclidean distances $M_{1e}$, and the signal conversion unit 11 connected to the remote unit #2 receives the squared Euclidean distances $M_{2e}$. The likelihood combination detection unit 17 then combines the squared Euclidean distances $M_{1e}$ and $M_{2e}$, and performs maximum likelihood decision using the combined likelihood information, to thereby output code words $c_1$ and $c_2$ corresponding to the transmission signals $s_1$ and $s_2$.

The transmission signals $s_1$ and $s_2$ transmitted from the terminal 30 undergo MIMO transmission expressed as Equation (1), the RF receiving unit 22 of the remote unit #1 receives the reception signal $r_1$ expressed as Equation (14) below, and the RF receiving unit 22 of the remote unit #2 receives the reception signal $r_2$ expressed as Equation (15) below.

[Equation 14]

$$r_1 = h_{11}s_1 + h_{12}s_2 + n_1 \quad (14)$$

[Equation 15]

$$r_2 = h_{21}s_1 + h_{22}s_2 + n_2 \quad (15)$$

The channel estimation unit 24 of the remote unit #1 can estimate the channel information $h_{e11}$ and $h_{e12}$ using the reception signal $r_1$, based on Equation (14). As with the remote unit #1, the channel estimation unit 24 of the remote unit #2 can estimate the channel information $h_{e21}$ and $h_{e22}$ using the reception signal $r_2$, based on Equation (15). Specifically, a known signal sequence is inserted into the transmission signals $s_1$ and $s_2$, and a difference from a received known signal sequence that has undergone channel variation due to wireless transmission is calculated, to thereby estimate channel information.

Focusing on the remote unit #1, the distributed MLD likelihood calculation unit 29 performs a distributed MLD process on the reception signal $r_1$. In the distributed MLD, if the transmission signals $s_1$ and $s_2$ are both modulated by means of BPSK, four transmission signal vector candidates $s_{c1}, s_{c2}, s_{c3}$, and $s_{c4}$ expressed as Equation (2) to Equation (5) are multiplied by a channel vector $h_{e1}$, which is estimated from the reception signal $r_1$ and is expressed as Equation (16) below,

[Equation 16]

$$h_{e1} = [h_{e11} \, h_{e12}] \quad (16)$$

and reception replicas $r_{1c1}, r_{1c2}, r_{1c3}$, and $r_{1c4}$ expressed as Equation (17) to Equation (20) below are generated.

[Equation 17]

$$r_{1c1} = h_{e1}s_{c1} = h_{e11}e^{j0} + _{e12}e^{j0} \quad (17)$$

[Equation 18]

$$r_{1c2} = h_{e12}s_{c2} = h_{e11}e^{j0} + h_{e12}e^{j\pi} \quad (18)$$

[Equation 19]

$$r_{1c3} = h_{e1}s_{c3} = h_{e11}e^{j\pi} + h_{e12}e^{j0} \quad (19)$$

[Equation 20]

$$r_{1c4} = h_{e1}s_{c4} = h_{e11}e^{j\pi} + h_{e12}e^{j\pi} \quad (2.0)$$

As with the conventional MLD, squared Euclidean distances $M_{1e}$ (e here is an integer from 1 to 4) between these reception replicas and the reception signal $r_1$ expressed as Equation (14) are calculated as Equation (21) to Equation (24) below.

[Equation 21]

$$M_{11} = \|r_1 - r_{1c1}\|^2 \quad (21)$$

[Equation 22]

$$M_{12} = \|r_1 - r_{1c2}\|^2 \quad (22)$$

[Equation 23]

$$M_{13} = \|r_1 - r_{1c3}\|^2 \quad (23)$$

[Equation 24]

$$M_{14}=\|r_1-r_{1c4}\|^2 \quad (24)$$

Then, the signal conversion unit 23 transmits information of these squared Euclidean distances to the central unit 10. A similar process is performed in the remote unit #2, and squared Euclidean distances $M_{2e}$ are transmitted to the central unit 10. In the central unit 10, the likelihood combination detection unit 17 combines the squared Euclidean distances collected from the remote units 20, for each transmission signal vector candidate, to obtain combined likelihoods Me expressed as Equation (25) to Equation (28) below.

[Equation 25]

$$M_1=M_{11}+M_{21} \quad (25)$$

[Equation 26]

$$M_2=M_{12}+M_{22} \quad (26)$$

[Equation 27]

$$M_3=M_{13}+M_{23} \quad (27)$$

[Equation 28]

$$M_4=M_{14}+M_{24} \quad (28)$$

Next, as continuation of the likelihood combination detection process in the likelihood combination detection unit 17, the transmission signal vector candidate that corresponds to the minimum combined likelihood among the values of the combined likelihoods is determined as an estimated transmission signal. Then, code words $c_1$ and $c_2$ corresponding to determined transmission signals $s_1$ and $s_2$ are output from the likelihood combination detection unit 17, and they undergo a decoding process in the decoding units 14, to be then supplied to the MAC function unit 15 as bit sequences $b_1$ and $b_2$. Specifically, a bit or bit sequence indicated by the modulation symbol of the estimated transmission signal $s_1$ is obtained as $c_1$, and a bit or bit sequence indicated by the modulation symbol of the estimated transmission signal $s_2$ is obtained as $c_2$. As a result, even if the transmission signals $s_1$ and $s_2$ are MIMO transmission signals, the reception signals can be detected for each transmission signal. The MAC function unit 15 performs a MAC process of the data link layer, using the bit sequences $b_1$ and $b_2$. The MAC process, for example, includes a process of requesting re-transmission of a signal that includes an error.

It is to be noted that for the signal conversion used for signal transmission between the central unit 10 and the remote units 20, an existing interface may be used, or a unique interface may be used. Moreover, information of the squared Euclidean distances transmitted between the central unit 10 and the remote units 20 may undergo quantization at a specific number of bits to reduce the amount of information. Furthermore, after RF reception has been performed at each remote unit 20, a process for performing reception of multi-carrier signals such as those in OFDM on reception signals may be performed. Moreover, in the process of the distributed MLD likelihood calculation unit 29, as the number of modulation levels and the number of transmission antennas increase, the number of transmission signal vector candidates increases exponentially, and thus the amount of information transmitted between the central unit 10 and the remote units 20 increases accordingly. Therefore, a technique that reduces the amount of computation may be used in the process of the distributed MLD likelihood calculation in each remote unit 20.

Embodiment 2

Figure 9:
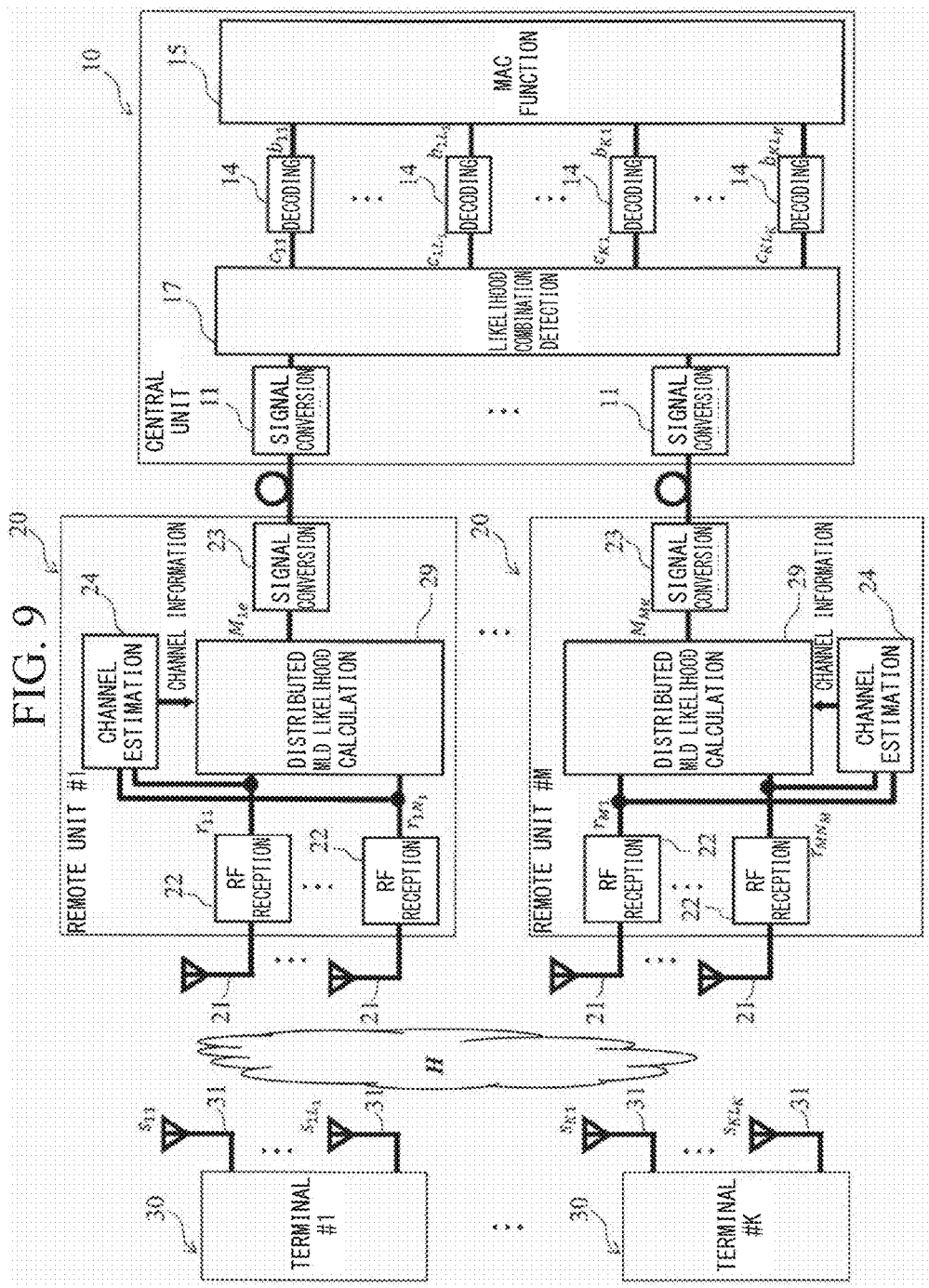
FIG. 9 shows an example of a wireless communication system in accordance with Embodiment 2.

In the case of using the technique of Embodiment 1, the number of terminals, the number of antennas of each terminal, the number of remote units, and the number of antennas of each remote unit may be set to arbitrary numbers, as will be described in Embodiment 2. FIG. 9 shows CoMP signal transmission in Embodiment 2. Here, the number of terminals is K, the number of antennas of terminals k (k is an integer from 1 to K) is $L_k$, the number of remote units is M, and the number of antennas of remote units m (m is an integer from 1 to M) is $N_m$. It is to be noted that the addition of noise in each RF receiving unit is omitted in FIG. 9.

In each remote unit 20, squared Euclidean distances that correspond to all of the transmission signal vector candidates are obtained by the process of the distributed MLD likelihood calculation unit 29. For example, $M_{1e}$ (e here is an integer from 1 to the number of squared Euclidean distances) are obtained in the remote unit #1, and $M_{Me}$ are obtained in the remote unit #M. The number of squared Euclidean distances is dependent on the total number of transmission antennas of all terminals and the number of modulation levels. Squared Euclidean distances collected from all of the remote units 20 are combined for each transmission signal vector candidate in the process of the likelihood combination detection unit 17 in the central unit 10, and the transmission signal vector candidate that corresponds to the minimum combined likelihood is determined as an estimated transmission signal. Then, code words $c_{ij}$ (i is an integer from 1 to K, j is an integer from 1 to $L_i$) corresponding to determined transmission signals are output, and after having undergone the decoding process in the decoding units 14, they are supplied to the MAC function unit 15 as bit sequences $h_{ij}$.

It is to be noted that for the signal conversion used for signal transmission between the central unit 10 and the remote units 20, an existing interface may be used, or a unique interface may be used. Moreover, information of the squared Euclidean distances transmitted between the central unit 10 and the remote units 20 may undergo quantization at a specific number of bits to reduce the amount of information. Furthermore, after RF reception has been performed at each remote unit 20, a process for performing reception of multi-carrier signals such as those in OFDM on reception signals may be performed. Moreover, in the process of the distributed MLD likelihood calculation unit 29, as the number of modulation levels and the number of transmission antennas increase, the number of transmission signal vector candidates increases exponentially, and thus the amount of information transmitted between the central unit 10 and the remote units 20 increases accordingly. Therefore, a technique that reduces the amount of computation may be used in the process of distributed MLD likelihood calculation in each remote unit 20.

Embodiment 3

Figure 10:
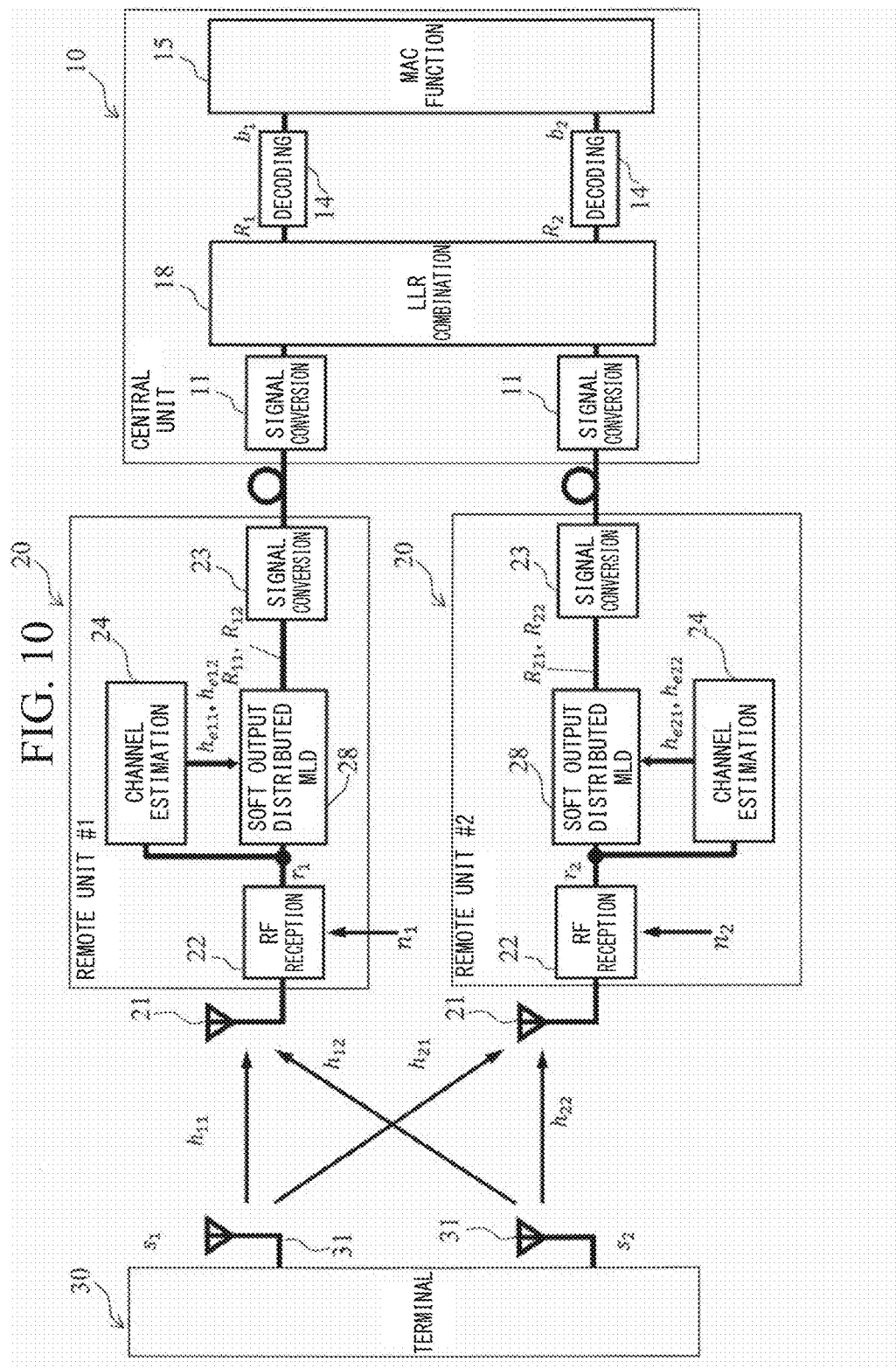
FIG. 10 shows an example of a wireless communication system in accordance with Embodiment 3.

In contrast with Embodiment 1, as will be described in Embodiment 3, a log likelihood ratio of each bit of a transmission signal may be calculated by performing a receiving process using soft decision in each remote unit 20, information of the output log likelihood ratio may be transmitted to the central unit 10, and information of the log likelihood ratios collected from the remote units 20 may be combined in the central unit 10, and a bit sequence may be detected by means of a decoding process using a soft input decoder based on the combined log likelihood ratio. FIG. 10 shows CoMP signal transmission in Embodiment 3. Each remote unit 20 is provided with an antenna 21, an RF receiving unit 22, a channel estimation unit 24, a soft output distributed MLD unit 28 that functions as a likelihood calculation unit, and a signal conversion unit 23 that functions as an inter-unit transmission unit. The central unit 10 is provided with signal conversion units 11 that function as inter-unit receiving units, a log-likelihood ratio (LLR) combination unit 18 that functions as a signal detection unit, decoding units 14, and a MAC function unit 15. Also in this case, the configuration is such that part of functions of the physical layer remains in the central unit 10 as shown in FIG. 3.

The communication method in accordance with the present embodiment is such that, in the likelihood calculation step, soft decision using channel information is performed to thereby calculate log likelihood ratios of the bits corresponding to each transmission signal, as likelihood of a reception signal. The soft output distributed MLD unit 28 of the remote unit #1 calculates, as likelihood information, log likelihood ratios $R_{11}$ of the bits corresponding to the transmission signal $s_1$ and log likelihood ratios $R_{12}$ of the bits corresponding to the transmission signal $s_2$. The soft output distributed MLD unit 28 of the remote unit #2 calculates, as likelihood information, log likelihood ratios $R_{21}$ of the bits corresponding to the transmission signal $s_1$ and log likelihood ratios $R_{22}$ of the bits corresponding to the transmission signal $s_2$.

In the remote unit #1, log likelihood ratios $R_{11}$ and $R_{12}$ of the bits corresponding to the transmission signals $s_1$ and $s_2$ are output as the likelihood information, by means of the process of the soft output distributed MLD unit 28. Here, one example of a specific processing method of soft output MLD is such that the nearest reception replica having the minimum squared Euclidean distance from the reception signal is identified, and then a reception replica having the minimum squared Euclidean distance from the reception signal, among reception replicas corresponding to bit sequences obtained by inverting one of bits of a bit sequence that corresponds to the nearest reception replica, is identified. Squared Euclidean distances between the two identified reception replicas and the reception signal are calculated, and the difference therebetween is obtained as a log likelihood ratio. The signal conversion unit 23 transmits the log likelihood ratios $R_{11}$ and $R_{12}$ to the central unit 10.

It is to be noted that when the number of modulation levels of a transmission signal increases, the number of bits that express the transmission signal also increases, and thus the number of pieces of log likelihood ratio information also increases. For example, when the transmission signals $s_1$ and $s_2$ are both modulated by means of BPSK, the number of pieces of log likelihood ratio information is two as described above, whereas when they are modulated by means of QPSK, the total number of bits becomes 4 bits, and the number of pieces of log likelihood ratio information also becomes four. In Embodiment 3, information of these log likelihood ratios $R_{11}$ and $R_{12}$ is transmitted to the central unit 10. A similar process is performed in the remote unit #2, and information of log likelihood ratios $R_{21}$ and $R_{22}$ is transmitted to the central unit 10. In the central unit 10, the log likelihood ratios collected from the remote units 20 are combined, for each transmission signal vector candidate, by means of the process of the LLR combination unit 18, and combined log likelihood ratios $R_1$ and $R_2$ expressed as Equation (29) and Equation (30) below are obtained.

[Equation 29]

$$R_1 = R_{11} + R_{21} \tag{29}$$

[Equation 30]

$$R_2 = R_{12} + R_{22} \tag{30}$$

Then, the decoding process is performed by the decoding units 14 based on these combined log likelihood ratios $R_1$ and $R_2$ using a soft decision input decoder such as a turbo decoder, and the resultant signal is supplied to the MAC function unit 15 as bit sequences $b_1$ and $b_2$. As a result, even if the transmission signals $s_1$ and $s_2$ are MIMO transmission signals, the reception signals can be detected for each transmission signal. The MAC function unit 15 performs a MAC process of the data link layer, using the bit sequences $b_1$ and $b_2$.

It is to be noted that for the signal conversion used for signal transmission between the central unit 10 and the remote units 20, an existing interface may be used, or a unique interface may be used. Moreover, information of the log likelihood ratios transmitted between the central unit 10 and the remote units 20 may undergo quantization at a specific number of bits to reduce the amount of information. Furthermore, after RF reception has been performed at each remote unit 20, a process for performing reception of multi-carrier signals such as those in OFDM on reception signals may be performed. Moreover, in the process of the soft output distributed MLD unit 28, the number of transmission signal vector candidates increases exponentially as the number of modulation levels and the number of transmission antennas increase, and thus a technique of reducing the amount of computation may be used in the process of the soft output distributed MLD unit 28 in each remote unit.

Embodiment 4

Figure 11:
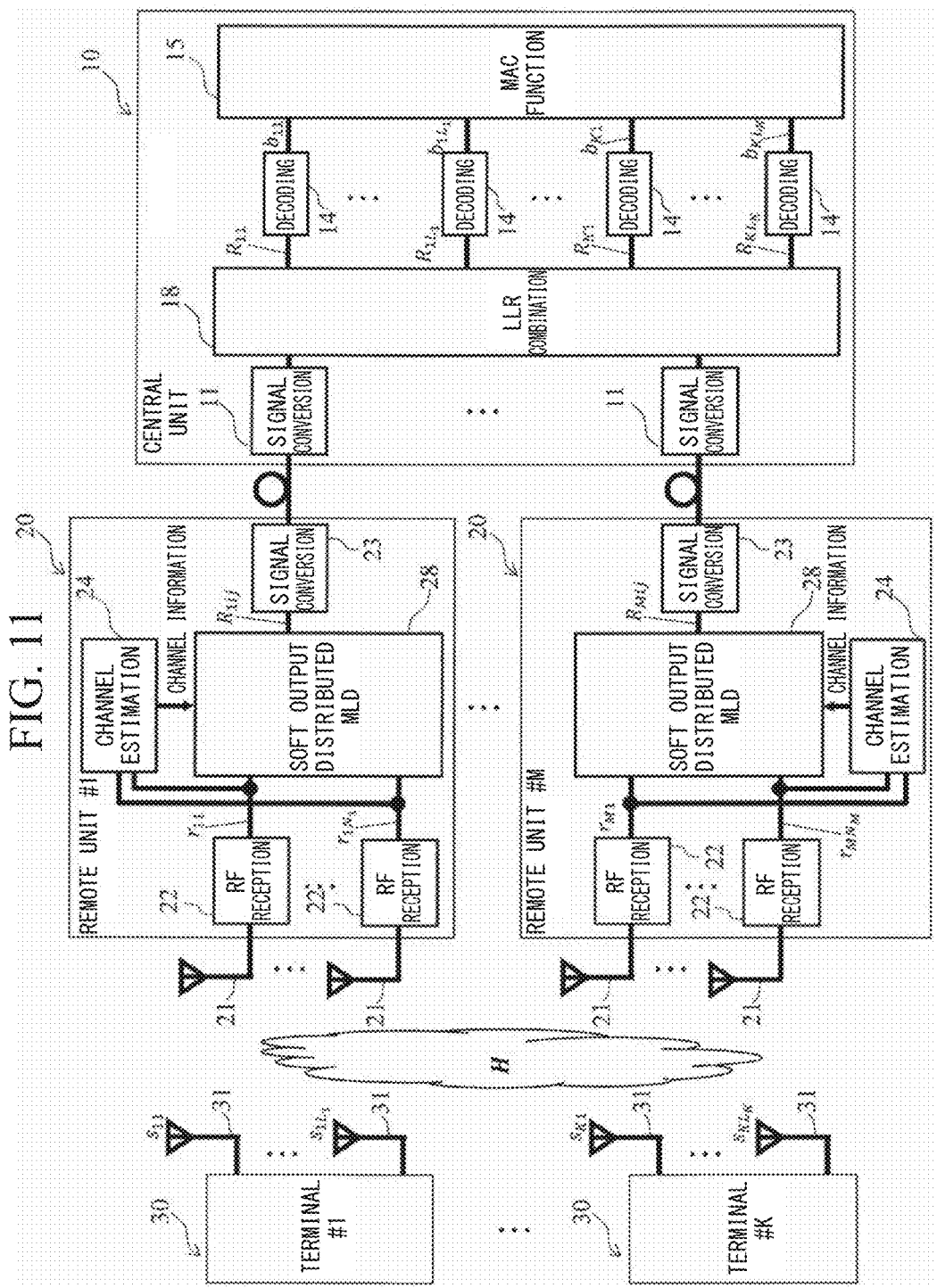
FIG. 11 shows an example of a wireless communication system in accordance with Embodiment 4.

In the case of using the technique of Embodiment 3, as will be described in Embodiment 4, the number of terminals, the number of antennas of each terminal, the number of remote units, and the number of antennas of each remote unit may be set to arbitrary numbers. FIG. 11 shows CoMP signal transmission in Embodiment 4. Here, the number of terminals is K, the number of antennas of terminals k (k is an integer from 1 to K) is $L_k$, the number of remote units is M, and the number of antennas of remote units m (m is an integer from 1 to M) is $N_m$. It is to be noted that the addition of noise in each RF receiving unit is omitted in FIG. 11.

In each remote unit, log likelihood ratio information that corresponds to all transmission signal vector candidates is obtained by the process of soft output distributed MLD. For example, $R_{1ij}$ (i is an integer from 1 to K, j is an integer from 1 to $L_i$) are obtained in the remote unit #1, and $R_{Mij}$ are obtained in the remote unit #M. The pieces of information of log likelihood ratios collected from all remote units are combined, for each transmission signal vector candidate, in the log likelihood ratio combining process in the central unit 10, and are output as combined log likelihood ratios $R_{ij}$ (i is an integer from 1 to K, j is an integer from 1 to $L_i$). Finally, after the decoding process using the soft input decoder has been performed in the decoding units 14 based on the combined log likelihood ratios, the resultant signal is supplied to the MAC function unit 15 as bit sequences $b_{ij}$.

It is to be noted that for the signal conversion used for signal transmission between the central unit 10 and the remote units 20, an existing interface may be used, or a unique interface may be used. Moreover, information of the log likelihood ratios transmitted between the central unit 10 and the remote units 20 may undergo quantization at a specific number of bits to reduce the amount of information. Furthermore, after RF reception has been performed at each remote unit 20, a process for performing reception of multi-carrier signals such as those in OFDM on reception signals may be performed. Moreover, in the process of the soft output distributed MLD unit 28, the number of transmission signal vector candidates increases exponentially as the number of modulation levels and the number of transmission antennas increase, and thus a technique of reducing the amount of computation may be used in the process of the soft output distributed MLD unit 28 in each remote unit. Furthermore, log likelihood ratios may be obtained using a process such as MMSE or SIC and soft decision demodulation, instead of the distributed MLD.

INDUSTRIAL APPLICABILITY

The present invention can be applied to the information communication industry.

DESCRIPTION OF REFERENCE SYMBOLS

10 Central unit
11 Signal conversion unit
12 Channel estimation unit
13 MIMO signal detection unit
14 Decoding unit
15 MAC function unit
17 Likelihood combination detection unit
18 LLR combination unit
20 Remote unit
21 Antenna
22 RF receiving unit
23 Signal conversion unit
24 Channel estimation unit
25 MIMO signal detection unit
26 Decoding unit
28 Soft output distributed MLD unit
29 Distributed MLD likelihood calculation unit
30 Terminal
31 Antenna
91 Core network
92 Cell

The invention claimed is:

1. A base station apparatus comprising:
at least one remote unit apparatus each comprising at least one antenna; and
a central unit apparatus connected to each remote unit apparatus via a transmission path,
wherein the antenna provided in the remote unit apparatus receives a transmission signal wirelessly transmitted from at least one wireless terminal each comprising at least one antenna, and
the remote unit apparatus comprising:
a channel estimation unit that estimates channel information between the antenna of the wireless terminal and the antenna of the remote unit apparatus, using a reception signal received by the antenna provided in the remote unit apparatus;
a likelihood calculation unit that calculates likelihood of each transmission signal included in the reception signal, for each antenna provided in the remote unit apparatus, using the channel information estimated by the channel estimation unit; and
an inter-unit transmission unit that transmits likelihood information calculated by the likelihood calculation unit to the central unit apparatus, and
the central unit apparatus comprising:
an inter-unit receiving unit that receives each likelihood information transmitted from the inter-unit transmission unit; and
a signal detection unit that combines the likelihood information received by the inter-unit receiving unit and outputs a signal corresponding to each transmission signal transmitted from the wireless terminal, using combined likelihood information.

2. The base station apparatus according to claim 1, wherein the likelihood calculation unit calculates a reception replica using the channel information, for each transmission signal vector candidate determined in accordance with a modulation scheme of the transmission signal, and calculates a squared Euclidean distance between the reception replica for each transmission signal vector candidate and the reception signal, as likelihood of the reception signal, and
the signal detection unit combines squared Euclidean distances received by the inter-unit receiving unit for each transmission signal vector candidate, and selects a transmission signal vector candidate that corresponds to minimum combined likelihood, to thereby output a code word corresponding to each transmission signal transmitted from the wireless terminal.

3. The base station apparatus according to claim 1, wherein the likelihood calculation unit calculates log likelihood ratios of bits corresponding to each transmission signal as likelihood of the reception signal by performing soft decision using the channel information, and
the signal detection unit combines the log likelihood ratios of the bits received by the inter-unit receiving unit, for each transmission signal, and outputs a combined value that corresponds to each transmission signal.

4. A wireless communication system comprising:
the base station apparatus according to claim 1; and
the at least one wireless terminal.

5. A communication method in a base station apparatus comprising: at least one remote unit apparatus each comprising at least one antenna; and a central unit apparatus connected to each remote unit apparatus via a transmission path, the communication method comprising:
a channel estimation step in which, when each antenna provided in the remote unit apparatus receives each transmission signal that is wirelessly transmitted from at least one wireless terminal each comprising at least one antenna, the remote unit apparatus uses a received reception signal to estimate channel information between the antenna of the wireless terminal and the antenna of the base station apparatus;
a likelihood calculation step in which the remote unit apparatus uses the estimated channel information to calculate, for each antenna provided in the remote unit apparatus, likelihood of each transmission signal included in the reception signal, and transmits the calculated likelihood of each reception signal to the central unit apparatus; and
a signal detection step in which the central unit apparatus combines likelihood information received from the remote unit apparatus, and outputs a signal corresponding to each transmission signal transmitted from the wireless terminal, using combined likelihood information.

6. The communication method according to claim 5, wherein in the likelihood calculation step, the remote unit apparatus calculates a reception replica using the channel information, for each transmission signal vector candidate determined in accordance with a modulation scheme of the transmission signal, calculates a squared Euclidean distance between the reception replica for each transmission signal vector candidate and the reception signal, as likelihood of the reception signal, and outputs the squared Euclidean distance to the central unit apparatus, and in the signal detection step, the central unit apparatus combines the squared Euclidean distance received from the remote unit apparatus, for each transmission signal vector candidate, and selects a transmission signal vector candidate that corresponds to minimum combined likelihood, to thereby output a code word corresponding to each transmission signal transmitted from the wireless terminal.

7. The communication method according to claim 5, wherein in the likelihood calculation step, the remote unit apparatus calculates log likelihood ratios of bits corresponding to each transmission signal as likelihood of the reception signal, by performing soft decision using the channel information, and transmits the log likelihood ratios to the central unit apparatus, and in the signal detection step, the central unit apparatus combines the log likelihood ratios of the bits received from the remote unit apparatus, for each transmission signal, and outputs a combined value that corresponds to each transmission signal.

8. A wireless communication system comprising:
the base station apparatus according to claim 2; and
the at least one wireless terminal.

9. A wireless communication system comprising:
the base station apparatus according to claim 3; and
the at least one wireless terminal.

* * * * *